United States Patent
Zhang et al.

(10) Patent No.: US 9,915,991 B2
(45) Date of Patent: Mar. 13, 2018

(54) SYSTEM AND METHOD OF USE FOR ENERGY EFFICIENT APPLICATIONS DRIVEN BY MULTIPLE CONTEXT CLOCKS FOR PERSONAL ENERGY FOOTPRINT MANAGEMENT

(71) Applicant: The Regents of the University of California, Oakland, CA (US)

(72) Inventors: Yang Arthur Zhang, Irvine, CA (US); Guann Pyng Li, Irvine, CA (US); Zachary Davis, Tustin, CA (US); Christopher Hurst, Westminster, CA (US); Jieping Guo, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 68 days.

(21) Appl. No.: 14/770,384

(22) PCT Filed: Mar. 14, 2014

(86) PCT No.: PCT/US2014/029540
§ 371 (c)(1),
(2) Date: Aug. 25, 2015

(87) PCT Pub. No.: WO2014/144933
PCT Pub. Date: Sep. 18, 2014

(65) Prior Publication Data
US 2016/0011636 A1    Jan. 14, 2016

Related U.S. Application Data

(60) Provisional application No. 61/793,160, filed on Mar. 15, 2013.

(51) Int. Cl.
*G06F 1/26* (2006.01)
*G06F 1/32* (2006.01)

(52) U.S. Cl.
CPC .............. *G06F 1/266* (2013.01); *G06F 1/324* (2013.01); *G06F 1/3237* (2013.01); *G06F 1/3287* (2013.01); *Y02B 60/1217* (2013.01)

(58) Field of Classification Search
None
See application file for complete search history.

(56) References Cited

U.S. PATENT DOCUMENTS

2003/0178894 A1* 9/2003 Ghent ................... D06F 33/02
307/140
2010/0124882 A1 5/2010 Griffin
(Continued)

*Primary Examiner* — Paul J Yen
(74) *Attorney, Agent, or Firm* — Marcus C. Dawes; Daniel L. Dawes

(57) ABSTRACT

A power state management system of an electronic system is coupled to a plug load device and a method for operation of the same. The system includes a context clock to adjust a duty cycle of the electronic system for controlling the power states of the electronic system for more efficient use of electricity. The context clock is responsive to user input, multiple event driven activities or an external protocol determined policy or command. Interface circuitry communicates user input, multiple event driven activities or an external protocol determined policy or command to the context clock. Interface circuitry also communicates commands to the managed plug load device or devices.

22 Claims, 7 Drawing Sheets

(56) References Cited

U.S. PATENT DOCUMENTS

| | | | |
|---|---|---|---|
| 2010/0138363 A1* | 6/2010 | Batterberry | G06Q 10/04 |
| | | | 705/412 |
| 2010/0187219 A1 | 7/2010 | Besore | |
| 2010/0332884 A1* | 12/2010 | Yoshida | G06F 1/3203 |
| | | | 713/324 |
| 2011/0184586 A1 | 7/2011 | Asano | |
| 2011/0296213 A1* | 12/2011 | Ferlitsch | G06Q 50/06 |
| | | | 713/320 |
| 2011/0304208 A1* | 12/2011 | Lee | G06F 1/266 |
| | | | 307/39 |
| 2012/0307646 A1 | 12/2012 | Xia | |
| 2012/0323382 A1 | 12/2012 | Kanel | |

* cited by examiner

SYSTEM AND METHOD OF USE FOR ENERGY EFFICIENT APPLICATIONS DRIVEN BY MULTIPLE CONTEXT CLOCKS FOR PERSONAL ENERGY FOOTPRINT MANAGEMENT

BACKGROUND

Field of the Technology

The disclosure relates to a system and method to utilize multiple context clocks, which are event driven activities such as user behavior, programmed content delivery, network status and variable electricity rates, combining with an internal electronic clock to adjust the duty cycle of an electronic system, such as plug load devices and appliances.

Related Applications

The present application is related to U.S. Provisional Patent Application Ser. No. 61/793,160, filed on Mar. 15, 2013, which is incorporated herein by reference and to which priority is claimed.

Description of the Prior Art

Residential electricity consumption, together with its associated generation and distribution losses, accounts for 15% of the total US energy consumption today. A 2005 residential consumption survey found that about 30% of a home's electricity is used by miscellaneous plug loads (presumably dominated by electronics), and the latest Department of Energy projections estimate that this will grow to almost 40% by 2035, while the energy demands of white goods and lighting will remain relatively stable.

A significant amount of research has been conducted in search of plug load power management solutions at the various levels of components, packaging, devices and systems. It is well recognized that the challenge is further complicated by the variety of plug-load devices, the many generations of devices, and the behavior of individual users. Consumer behavior has always been the biggest unknown factor; consumers exhibit diverse usage patterns of the same devices.

A traditional energy management system (EMS) manages energy usage by reacting passively to occupancy, environment, direct user inputs, and network changes. Such systems usually target commercial buildings and large, homogeneous systems such as HVAC and lighting. For plug load needs, systems at smaller scales are often attempted such as smart plug strips or home-energy dashboards), but they are still based on a passive, reactive design. To achieve optimal efficiency goals, active user interventions are still required in these plug load management systems.

What is needed is a system architecture which can integrate user behavior and other context information into the power state decision making process at both device and system level. The hierarchy of various context inputs should be defined to balance the frequency of user intervention and the efficiency of managed system. Some kind of electronics design for such a unit, as a standalone device or an integrated module is needed.

BRIEF SUMMARY

The system and method of the illustrated embodiments of the invention utilize multiple context clocks which empowers the consumer in managing a plurality of power and functional states of plug load devices without frequent user intervention and leads to better energy efficiency and lower power consumption.

The electricity usage context information is utilized in an external or internal clock system to govern the duty cycle of a plurality of electronics devices and appliances. The clock is a combination of more than two clock inputs. The clock signal can be generated both by electronic clock and event driven activities. For example, it can originate from traditional electronic circuits for timing purposes, a biological clock by personal daily activities, an environmental clock detecting ambient condition changes, a network system clock such as information download, authorization, content delivery etc. as mandated by a service provider, variable electricity rate clock set up by utilities, and/or a user pattern clock determined by a routine practice.

The disclosed method utilizes any combination of two or more clocks, i.e. electronic and non-electronic clocks, allowing for an electronic controller to adjust a duty cycle of a given electronic appliance or device for achieving better use of the device in both energy efficiency and user experience, while the user's experienced feature and function of the device is minimally affected. The clock system can further recommend and acknowledge efficient usage habits via an intelligent intervention algorithm, and influences plug load device usage and purchase decisions, in accordance with energy policies and incentive programs.

More specifically the illustrated embodiments of the invention include a power state management system of an electronic system including at least one plug load device. The system includes a context clock to adjust a duty cycle of the electronic system for controlling the power states of the electronic, system for more efficient use of electricity, where the context clock is responsive to user input, multiple event driven activities or an external protocol determined policy or command. Interface circuitry communicates user input, multiple event driven activities or an external protocol determined policy or command to the context clock. Interface circuitry also communicates commands to the managed plug load device or devices.

In one embodiment the context clock is responsive to multiple event driven activities including, but not limited to, a behavioral or biological clock responsive to an input communicated to the clock as determined by personal daily activities related to the usage of plug load devices to control the duty cycle.

In another embodiment the context clock is responsive to multiple event driven activities comprises an environmental clock responsive to an input which detects ambient conditions to control the duty cycle. The environmental clock is responsive to an input which measures ambient conditions including, but not limited to, lighting, temperature, humidity, sound pressure level, proximity of a body, or optical data signals.

In still another embodiment, context clock is responsive to an external protocol determined policy or command and constitutes a network clock responsive to information download or authorization as mandated by a service provider, or a variable electricity rate clock set by utilities.

The power state management system includes a system memory where the context clock is responsive to user input, multiple event driven activities or an external protocol determined policy or command to constitute a usage pattern clock determined by a historic record of a behavioral or biological clock, an environmental clock, and a network clock, each stored in the system memory.

In one embodiment the context clock generates a power state schedule, based on a behavioral or biological clock, art environmental clock, and a network clock, each stored in the system memory, the context information at any given time being ranked according to a predetermined hierarchy. One example of this hierarchy would be, in the order of decreasing priority, direct user inputs, behavior sensor inputs, environmental sensor inputs, a utility rate clock, a network clock, and usage pattern respectively.

In another embodiment the context clock generates a power state schedule according to a specific user, service provider and utility agreement, a hierarchy of control by the context clock in response to multiple inputs, information, data or states of other subclocks is changeable according to a predetermined rule, order or agreement.

In still another embodiment the context clock includes a stand-alone context clock customized to control and report on a number of devices and applications with respect to their power state schedules. The stand-alone context clock comprises a dongle with universal serial bus (USB) Connectivity. The dongle includes wireless connectivity.

In one embodiment the context clock is a context clock integrated within a single application's internal electronics to control and report power state schedules. The power state management system includes a power bus included within the internal electronics to control and supply direct current power for an electronic component. The electronic component includes a central processing unit (CPU), hard drive, memory, audio/visual output device and/or tuner.

In another embodiment the context clock selectively controls a single device or a plurality of connected applications according to an optimal power state schedule.

The power state management system further includes communication circuitry communicated with the context clock to collect voluntary usage patterns and/or field data and transmit the patterns and data to a regulatory agency or utility company. The power state management system further includes a database system hosted by the regulatory agency or utility company to collect usage patterns and/or field data.

In still another embodiment the context clock includes an energy management system with minimal amount direct inputs, so that it is substantially user-intervention-free.

The illustrated embodiments also include a method to control an electronic system comprising the steps of providing a power state management system with a stand-alone clock to adjust a duty cycle of the electronic system for controlling the power states of the electronic system for more efficient use of electricity, where the stand-alone clock is responsive to user input, multiple event driven activities or an external protocol determined policy or command, and programming the stand-alone clock with remote control protocols and/or key codes for existing home appliances, lighting, electric or electronic devices.

In one embodiment the method further includes the step of updating software modules to allow connected device to update an internal power management scheme. The internal power management scheme includes standby, light sleep and deep sleep functions, and/or "on" or "off" states.

In another embodiment the invention includes a method for control of a power state management system comprising the steps of providing a power state management system with an integrated context clock within a single application's internal electronics to control and report power state schedules of use, where the internal electronics is selectively activated on a demand of end usage determined by the integrated context clock, and to adjust a duty cycle of the electronic system for controlling the power states of the electronic system for more efficient use of electricity, where the integrated context clock is responsive to user input, multiple event driven activities or an external protocol determined policy or command, and programming the integrated clock with remote control protocols and/or key codes for existing home appliances, lighting, electric or electronic devices.

In still another embodiment of the method for control of a power state management system comprises the step of managing a plurality of power states schedules of home electronic devices and appliances using a hub having a context clock.

In one embodiment the method further includes the step of determining an optimal power management plan by information including as electricity rates from a utility company, a software update package from a service provider and/or behavior pattern from a personal mobile device.

In another embodiment the method further includes the step of collecting electricity usage information and communicating the electricity usage information to a remote database.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

The illustrated embodiments of the invention relate to the energy efficiency industry, in particular, plug load efficiency for commercial and residential use. Plug load is the energy used by a product that is powered by means of an ordinary AC plug (e.g., 100, 115, or 230 V). This generally excludes those installed inside a building during construction such as HVAC, lighting, water heating, etc. Plug load devices typically include the majority of consumer electronics and home appliances such as washing machines, dish washers, etc. This disclosure includes context and behavior aware energy efficient plug load devices and systems. It can also be utilized to manage automated control of HVAC, lighting, water heating, etc, when communication between them is established.

Figure 1:
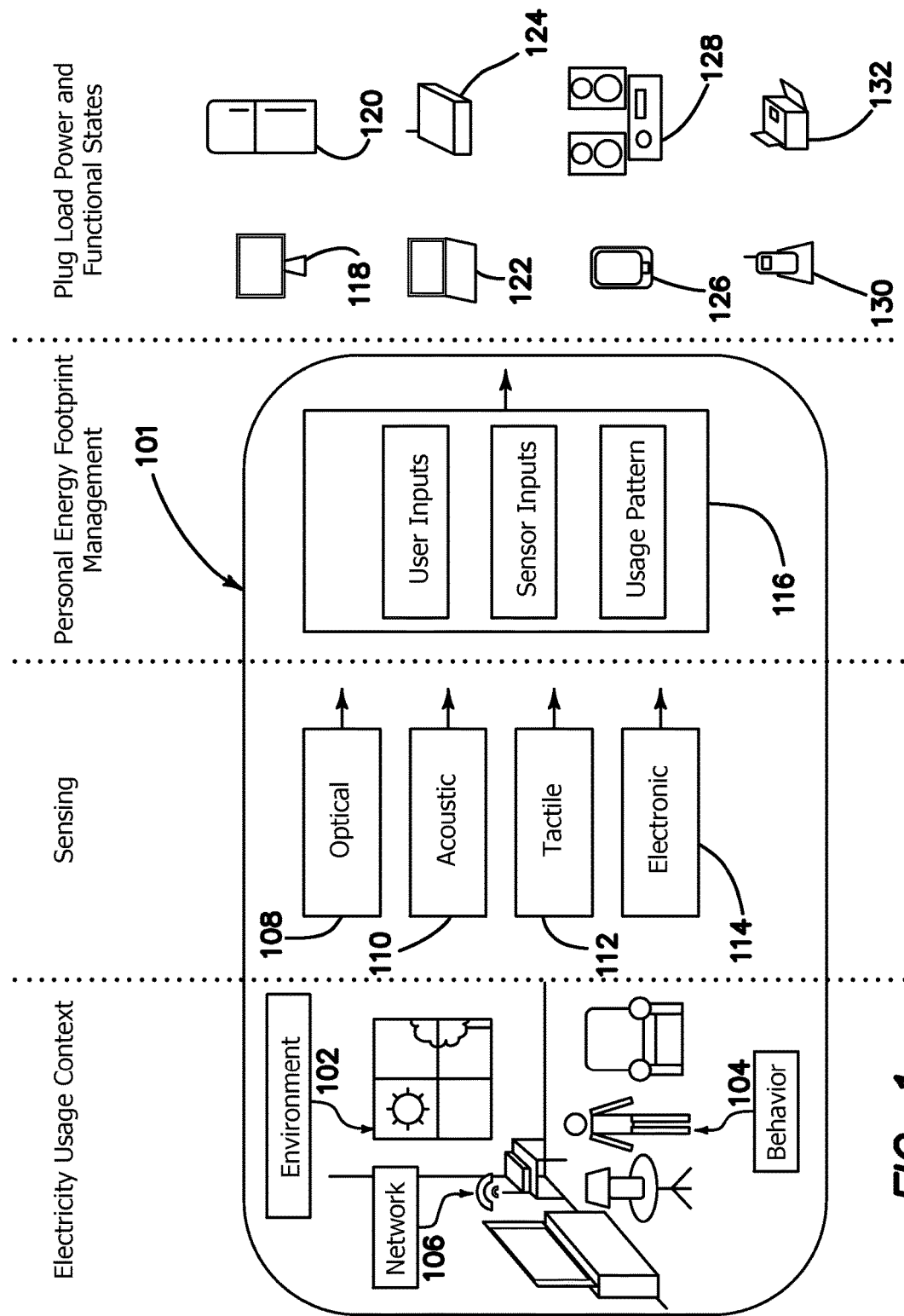
FIG. 1 is a block diagram that illustrates a power state management system utilizing multiple clocks, including ones generated from electronics, environment, network (service provider or utility), and user behavior.

FIG. 1 is a functional block diagram that illustrates an embodiment of a power state management system 101 and how it relates to the surrounding, user's environment and a plurality of appliances or plug load devices. The power state management system 101 utilizes multiple clocks, including ones generated from electronics, a surrounding, environment, a network (service provider or utility), and user behavior. A set of sensors 108, 110, 112, and 114 corresponding to a variety of inputs are included to sample the electricity usage context and convert it to electronic signals. The context information at any given time is ranked in order of decreasing priority within an input management subsystem 116 which comprises user inputs, sensor inputs and a usage pattern. A new usage pattern clock for controlling an on/off duty cycle for a plug load device to increase energy efficiency then generated from the input management subsystem 116 to control the operating schedule for a particular plug load device or a network of such devices. This allows various clock signals to be generated from a variety of sources including consumer behavior 104, environmental factors 102, a user's biological clock, networked appliances 106, a service provider, a utility, or any other suitable sources to merge into a control clock for a plug load device to adjust its on/off duty cycle, and thus its energy efficiency as part of a personal energy footprint management system 101. Thus, the personal energy footprint management system 101 includes user inputs, sensor inputs and usage pattern inputs, collectively denoted by reference numeral 116 as the input management subsystem. A plurality of devices or loads are thereby controlled, such as loads for common devices or appliances including but not limited to televisions 118, refrigerators 120, personal computers 122, internet modems or routers 124, cell phones or cell phone chargers 126, stereos 128, telephones 130, and printers or fax machines 132.

Figure 2:
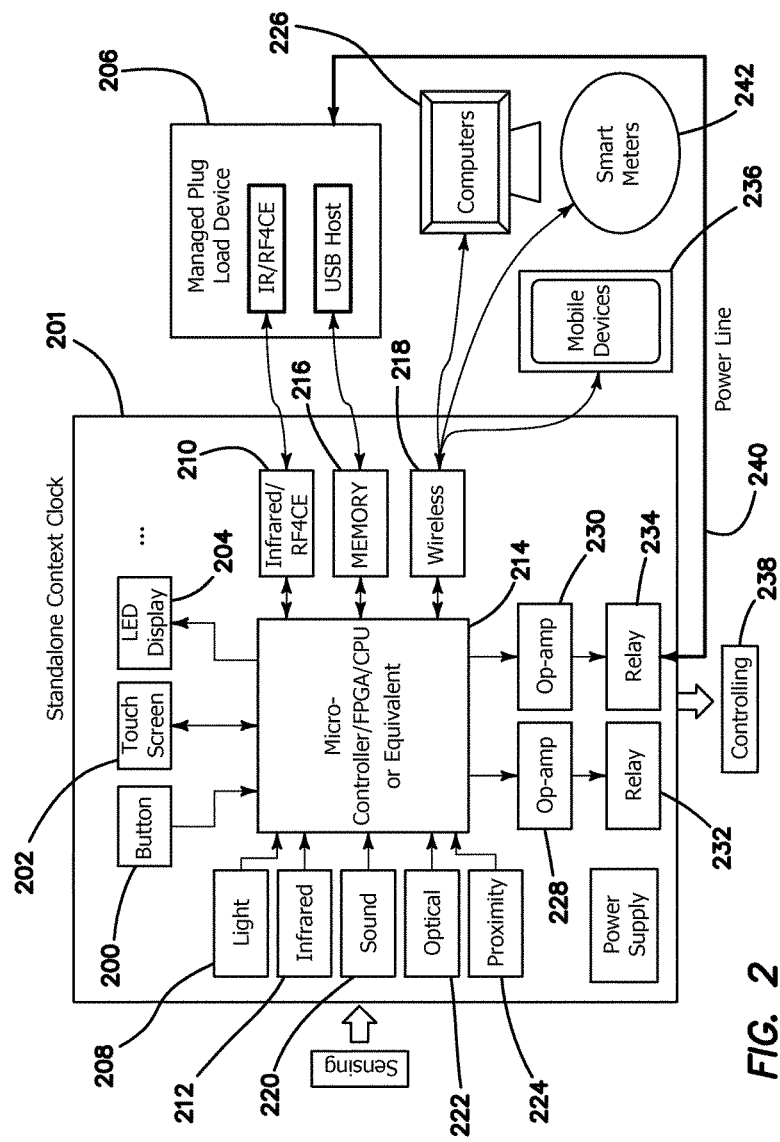
FIG. 2 is a block diagram of a specific embodiment of the personal energy footprint management system, where a stand-alone context clock is designed to control and communicate with a single plug load device.

FIG. 2 is a block diagram of an embodiment of the internal components of the personal energy footprint management system 101 itself, where a stand-alone context clock 201 is designed to control and communicate with a single plug load device 206. The figure illustrates the solution to retrofitting existing electronic devices and appliances with context based power management using the energy footprint management system 101. In particular, the standalone context clock 201 communicates with a given plug load device 206 via conventional digital, infrared or radio control protocols. The plug load device 206 comprises an internal IR/RF4CE and USB host coupled to an infrared/radio frequency interface circuit 210 and to a memory 216 within the energy footprint management system 101, respectively. The context clock 201 gains access to device internal operation modes in the plug load device 206, such as active and sleep, in order to implement scheduled power states. The plug load device 206 when under the control of the context clock 201 can read and write from the memory 216 in the energy footprint management system 101 to perform authentication and obtain driver software and further application codes through the USB host. The context clock 201 can also control a power line 240 of the plug load device 206 directly to enable a completely unplugged mode.

The inputs of context clock 201 include a means for direct user override control such as a touch screen 202, a button 200, interfacing protocols within the managed plug load device 206, a conventional wired or wireless communication link with outside network devices such as a smart meter 242, mobile devices 236, or a computer 226. Further inputs include the signals from a suite of event driven light, infrared, sound, optical or proximity sensors coupled to a light interface circuit 208, an infrared sensor interface circuit 212, a sound pressure interface circuit 220, an optical sensor interface circuit 222, and proximity sensor interface circuit 224, respectively. In a typical scenario, to generate a new clock signal for the managed plug load device 206 such as an electric appliance or other plug-in device, a computing unit or circuit, such as a microcontroller 214, will sample the current signals from all context inputs, specifically those obtained from the sensors 208, 212, 220, 222, 224 of the energy footprint management system 201 and those from any outside network devices 226, 236, 242. According to a predetermined priority of the inputs in a given system profile, one request for a certain power state is considered superior to the others. For example, if the sensors detect a user intention to turn on the device via the touch screen 202 and the microcontroller 214 determines that the user input is inconsistent with a previously stored usage pattern, the microcontroller 214 determines it as an irregular case and the sensor inputs are given higher priority. When a high priority input is absent, the system defaults to the next priority level input. A final power state schedule for the next instance is determined collectively by all the context inputs. Output or control signals are provided from microprocessor 214 to Op-amps 228, 230 and thence to relay 232 and relay 234 for power control from the power supply to the managed plug load device 206.

Figure 3:
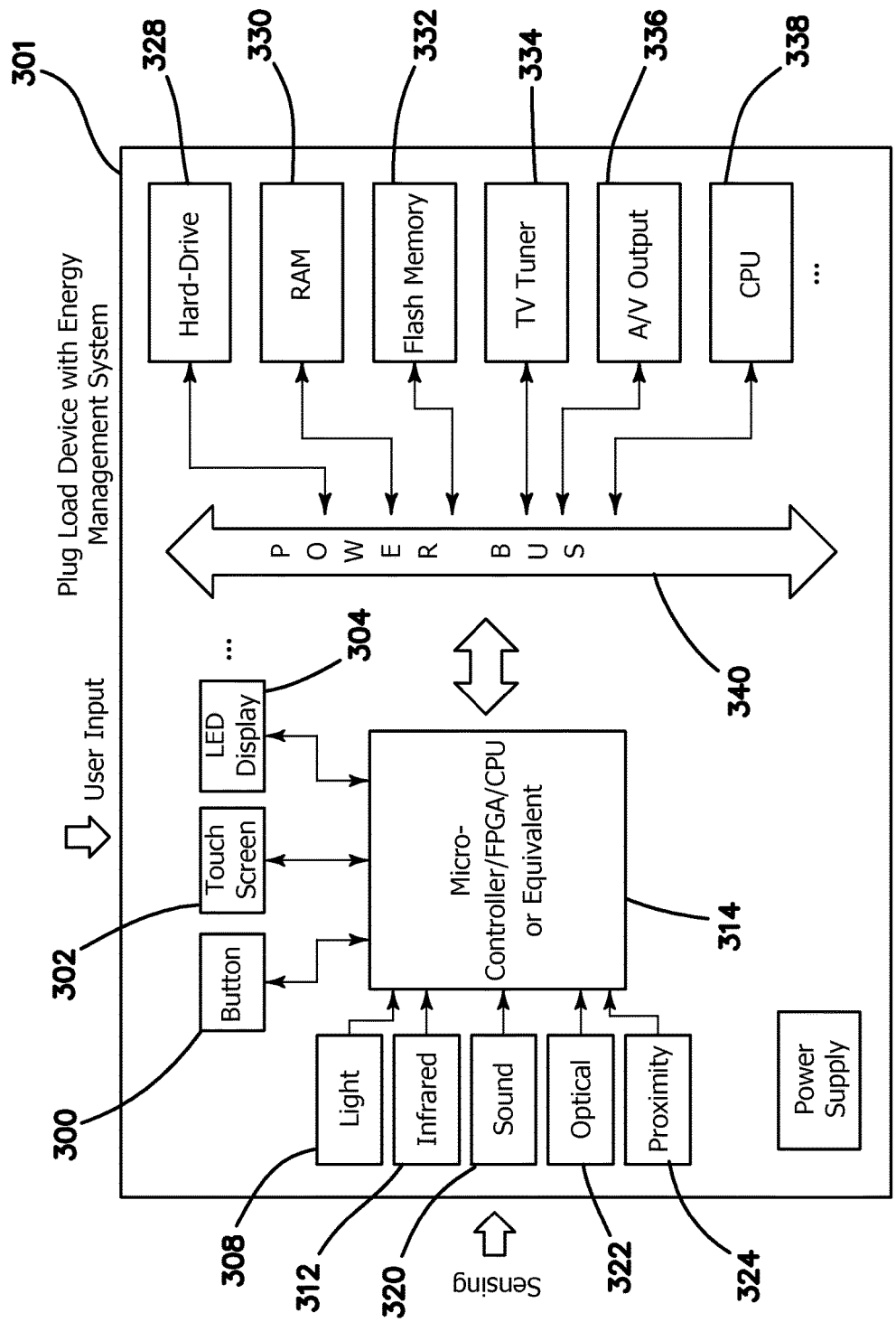
FIG. 3 is a block diagram of a specific embodiment of personal energy footprint management where a context clock is integrated within a plug load device.

FIG. 3 is a block diagram of a specific alternative embodiment of a personal energy footprint management system 301 where the energy footprint management system 301 is integrated, within a plug load, device 301 itself. This illustrates a solution for future electronic devices and appliances to incorporate a context based power management system. In particular, the context clock is included within the board design along with peripheral sensors and user input channels. Light, infrared, sound, optical and proximity sensors are coupled to a light interface circuit 308, an infrared interface circuit 312, a sound interface circuit 320, an optical interface circuit 322 and a proximity interface circuit 324 that are within the energy footprint management system 301, respectively. Each of the circuits 308, 312, 320, 322, 324 are in turn are coupled to a microprocessor 314. Similarly, user inputs such as a button 300, a touch screen 302, or a remote control 304 are coupled to die microprocessor 314. The remote control interface 304 is conventionally communicated with any kind of remote controller desired as is known. The microprocessor 314 selectively couples a power supply 306 to a power bus 340. The internalized context clock of microprocessor 314 controls the power bus 340 to distribute direct current power to the main components of the plug load device 301, such as a CPU 338, a hard-drive 328, a display or an A/V output 336, a RAM 330, a flash memory 332, a TV tuner 334, and/or any other powered component now known or later devised, which is part of the plug load device 301.

Figure 4:
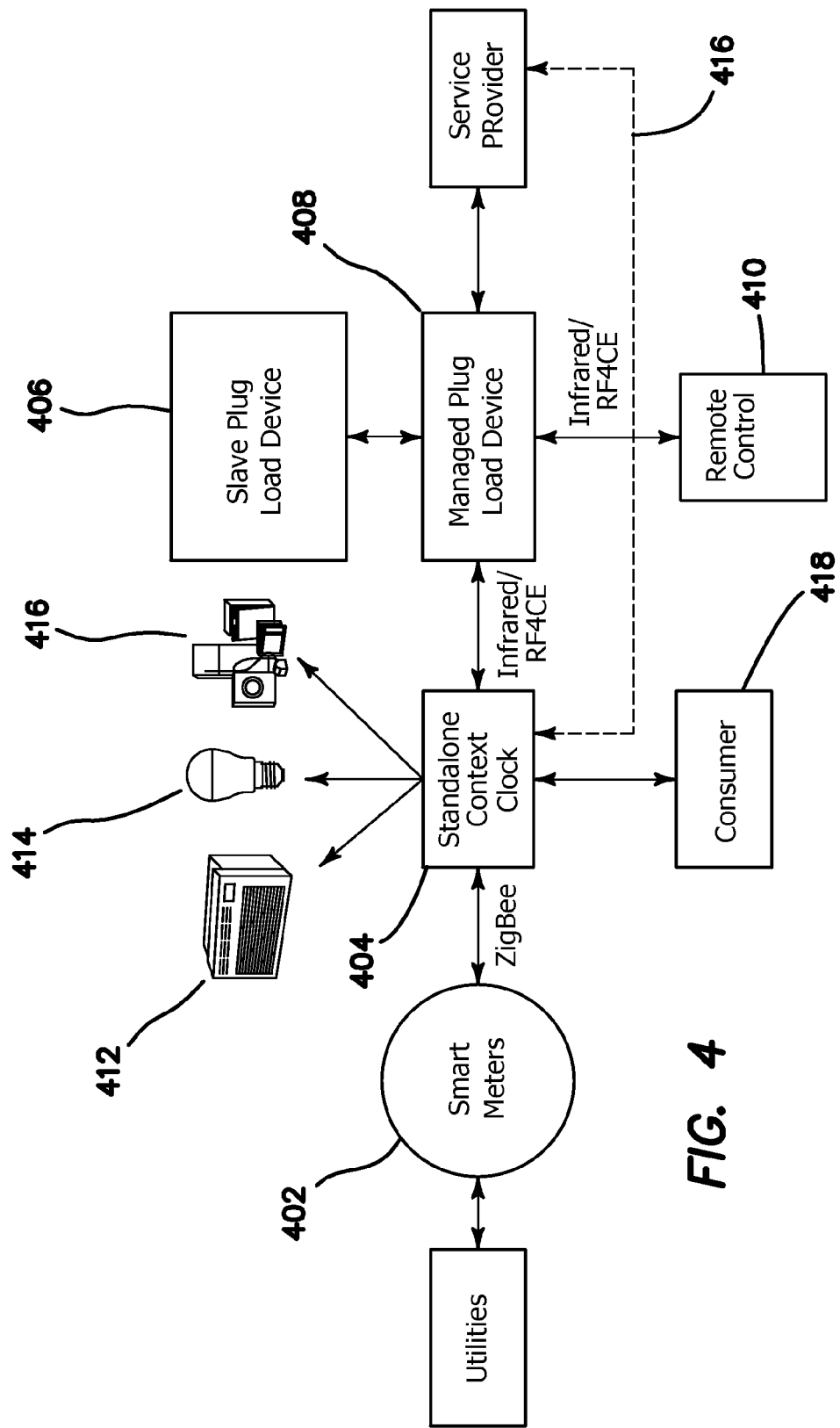
FIG. 4 is a block diagram for a method of use for the invention.

FIG. 4 is a block diagram illustrating a method of using the embodiment of the energy footprint management system 101 seen in FIG. 2 where the energy footprint management system 101 is used to retrofit and control an existing plug load device 408. The energy footprint management system 101 comprises a context clock 404 which combines control functions and the input from multiple entities such as consumers, service providers, or utility companies to achieve a common goal of energy saving by adopting an "adjustable clock" controlled by at least two clock signals originated internally or externally. The context clock device 404 is preprogrammed via infrared or RF4CE remote control protocols for existing appliances such as but not limited, to an air conditioning unit 412, lighting fixtures 414, other appliances 416, or from the plug load device 408 itself. The clock 404 then serves as an information brokerage device to combine utility generated variable electricity rates from a smart meter 402 with the user's daily activity in order to generate an overall power state schedule for each plug load device 408 under its control. It should be noted that other networked devices not explicitly shown within FIG. 4, such as a set-top box provided by a television service providers (not shown), may also be used to report current power state(s) and receive power state(s) schedules from the clock 404.

FIG. 4 also illustrates the ability of the standalone context clock 404 to connect with other devices. In particular, the context clock 404 can communicate with smart meters 402 through an IEEE 802.15.4 (ZigBee) protocol. Current household electricity usage and variable electricity rates can be downloaded to the context clock 404. The clock 404 interfaces with existing, plug load devices 408 through an infrared protocol in the case of older generation electronics, or RF4CE in the case of newer generation electronics. The managed plug load devices 408 can accept middleware or software updates from the clock 404.

In one specific example using the current method shown in FIG. 4, a traditional scenario is where a paid TV program or cable set-top box is installed to a television set. The set-top box remains powered unless the consumer unplugs the set-top box. Unplugging the set-top box ensures that no power is being consumed when the set-top box is not be used, however the consumer tradeoff in unplugging the set-top box is that the set-top box will spend up to minutes of time, exchanging authorization codes and program guides before it can display a TV program. The majority of consumers therefore do not habitually unplugged their set-top boxes and instead pay the electricity bill to support the set-top boxes running continuously day and night without interruption. Utility companies bear the overall energy burden in supplying the set-top boxes with power even when consumers are not watching TV.

By implementing of the standalone context clock 404 generated by the energy footprint management system 101, the individual consumer's actual TV watching behavior is linked to the power state of the set-top box. The set-top box remains at an "off" state by default. As the schedule generated by the context clock 404 carries forward, the clock 404 automatically turns on the set-top box according to the most frequent TV watching pattern that has been previously generated by the user and stored in the clock 404, unless one or more of the sensors detect that the user not paying attention to the TV, for example when the user manipulates that TV though a remote control 410. Additionally, if the user changes or deviates from the generated schedule for a certain day, the plurality of input sensors contained within the energy footprint management system 101 can detect the user's presence near the set-top box using the light interface 208 or proximity sensor interface 224 circuits seen in FIG. 2 before the user actually activates the remote control 410. The set-top box is then turned on by the clock 404 in ample time before the user's actual activation, thus greatly reducing the perceived consumer tradeoff in waiting time. The service provider can also connect to the clock 404 through a signal line 416 during off peak hours to download large amounts of data required for a program guide or system updates. The utility companies can potentially semi variable electricity rate information to the clock 404 via a smart meter 402, so that it can determine peak and off-peak hours in real time.

Figure 5:
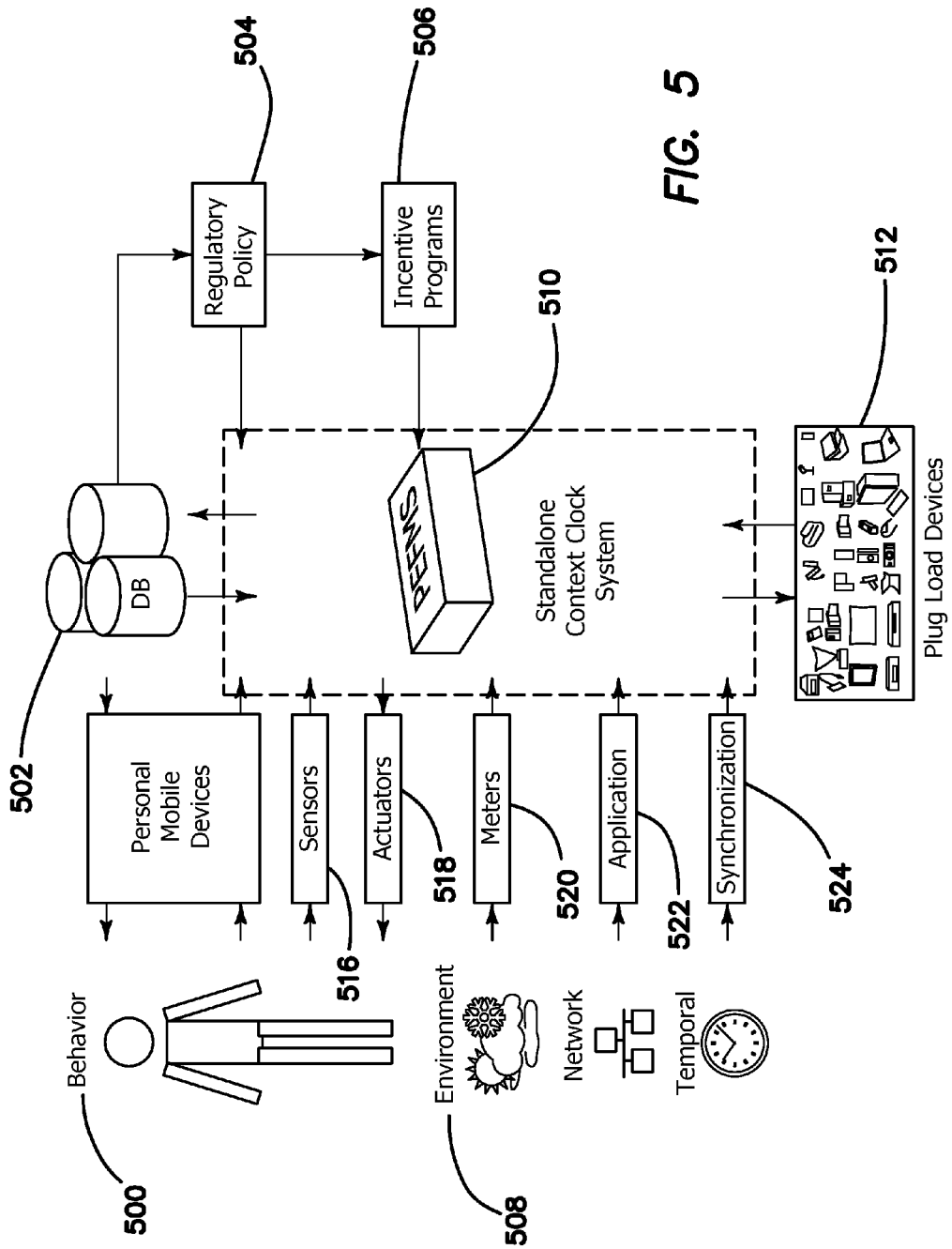
FIG. 5 is a block diagram for a standalone context clock system in application for personal energy footprint management.

FIG. 5 is a block diagram for an alternative embodiment of a standalone context clock system 510 in art application for personal energy footprint management. The clock system 510 serves as the central hub for exchanging information such as electricity usage, duty cycles and rates from a plurality of sources. Several closed loop information feedback cycles included are: behavior context 500, usage context 508, regulatory policy 504 and incentive programs 506. Regulatory agencies and utility companies can collect voluntary usage patterns and field data through the clock system 510. A database 502 is hosted by either agencies or utility companies. A plurality of plug load devices 512 are managed with bidirectional communication exchanged with personal mobile devices, inputs received from the sensors 516, inputs received from meters 520, applications 522 and synchronization controls 524, and commands given to actuators 518.

Figure 6:
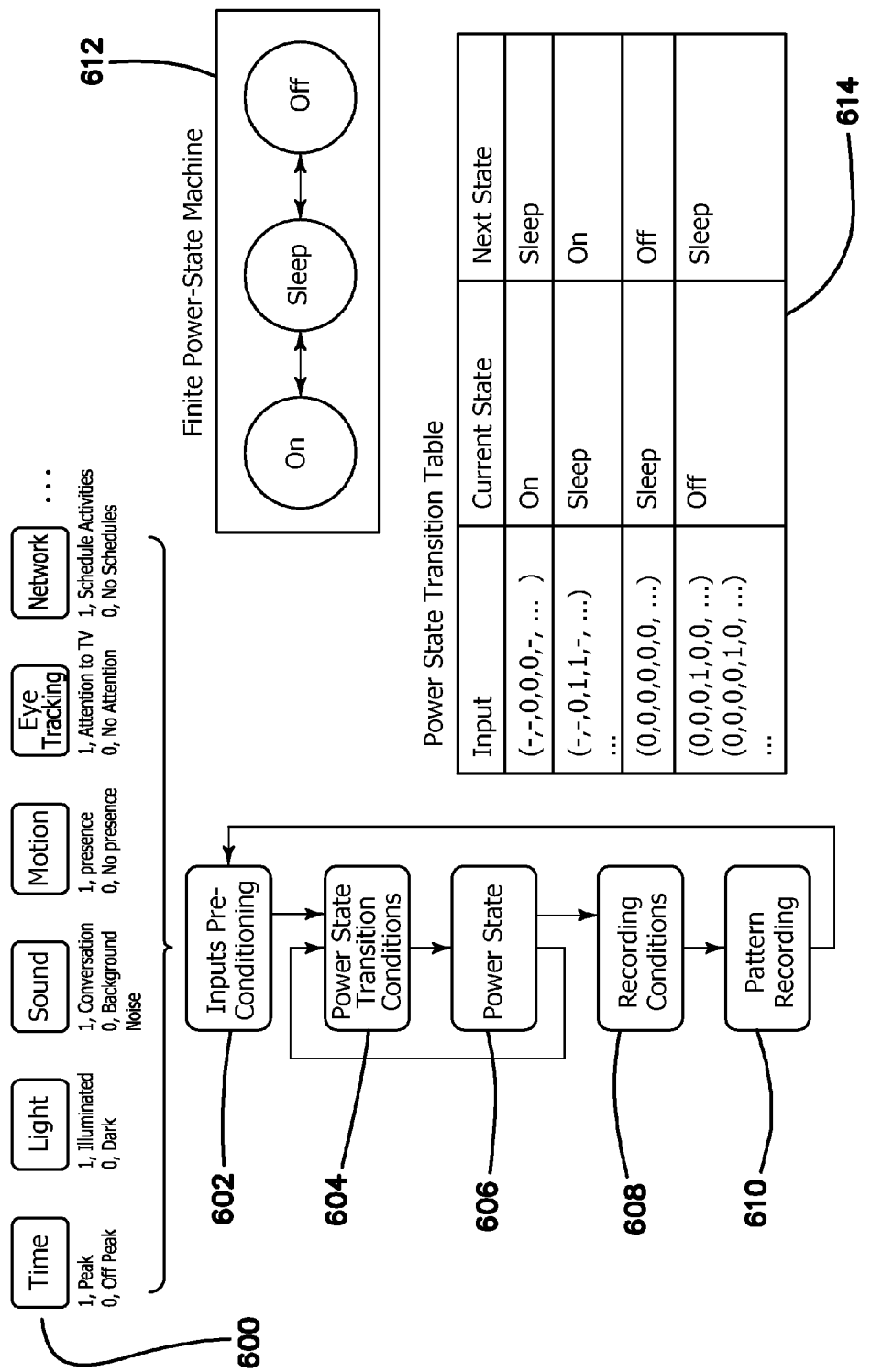
FIG. 6 is a diagram that illustrates the method of a standalone clock device or an integrated device to adjust a finite set of power states for a managed plug load device.

FIG. 6 illustrates a method of using a standalone clock device or an integrated device to adjust a finite set of power states 612 for a managed plug load device, namely On, SLEEP, and OFF. Analog inputs 600 from a plurality of context clocks are preconditioned to digitized states. For example, time is given a value of 1 when at peak and a value 0 when off peak. Light is given a value of 1 when illuminated and a value of 0 when dark. Sound is given a value of 1 when it is recognized as human conversation and a value of 0 when the noise is determined to be nonhuman background noise. Motion is given a value of 1 when motion is detected or present and a value of 0 when motion is undetected or absent. Eye tracking is given a value of 1 when attention to the TV is detected and a value of 0 when attention to the TV is not detected. Finally, network is given a value of 1 when there is a scheduled activity occurring and a value of 0 when no activity is scheduled. The inputs are preconditioned at step 602. The power state transition conditions are determined at step 604. The power state transition table 614 is used to decide the direction of the next power state change, and the power state transition is performed at step 606. For example, if the plug load device being managed is currently in the "on" state, but the sound, motion, and eye tracking inputs return values of 0 for their respective parameters, the power state of the plug load device is downgraded from "on" to "sleep." Conversely, if the plug load device is in the "off" state but the motion and eye tracking inputs each return a value of 1 for their respective parameters, the power state of the plug load device will be advanced from "off" to "sleep." If there is no transition performed, the method returns to step 604 to determine the power state transition conditions. Once a power state transition is performed, the recording function 608 compares its frequency and time of a day with a historical record. If similar transition occurs at a frequency and repetition exceeding a predetermined threshold, the event is recorded as a pattern, which influences future power state transitions. The pattern is recorded at step 610. The method then returns to preconditioning of the next inputs at step 602.

Figure 7:
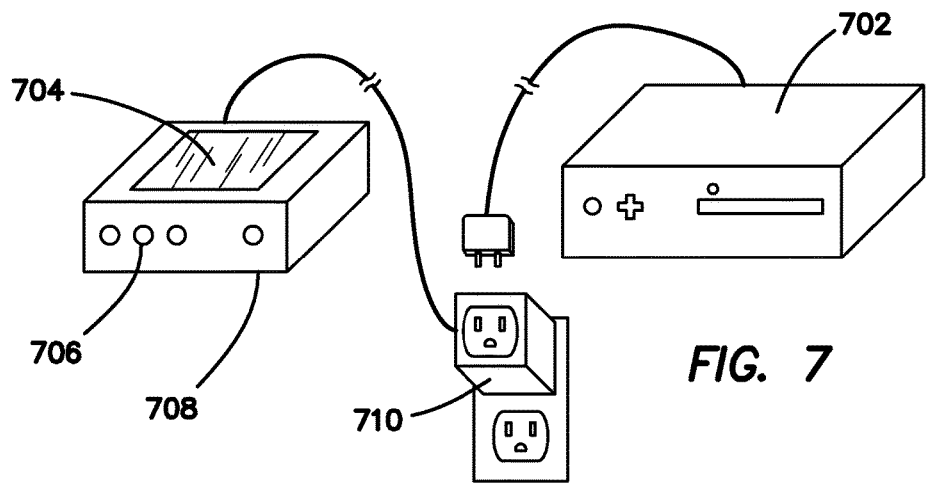
FIG. 7 is a diagram that illustrates the enclosure design of a standalone clock device in operation with the managed plug load device.

FIG. 7 illustrates an exemplified embodiment of an enclosure design for a standalone clock device 708 in operation with a regular household electric outlet and a managed device 702, such as a set-top box for paid TV programs. The front mounted sensors 706 are directed towards users and an active living room space for collecting context information. A plurality of top mounted sensors 704 are optional depending on the location of the device relative to its placement within a household or its proximity to the managed device 702. The managed device 702 is power managed through a relay box 710 controlled by and coupled to the clock 708. A wireless communications scheme may also be connected between the clock 708 and the managed device 702, such as an infrared link and a ZigBee Chip with further controls the power states of managed device 702.

Figure 8:
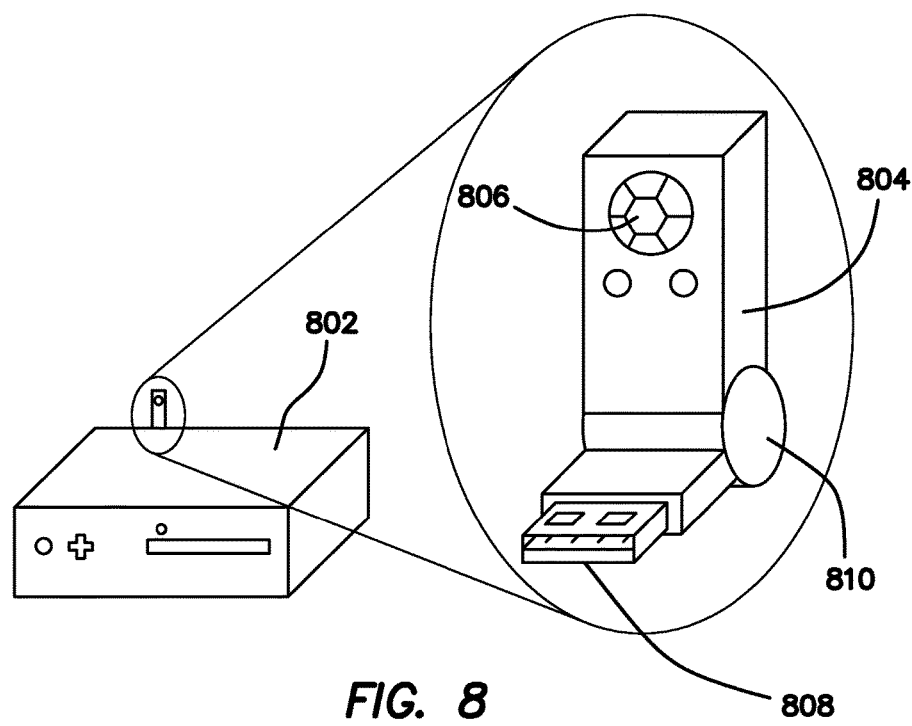
FIG. 8 is a diagram illustrating the USB form factor of the standalone clock device working with a USB enabled plug load device (802).

FIG. 8 demonstrates an alternative embodiment for a standalone clock device 804, A Universal Serial Bus (USB) dongle design can be plugged into a USB ready electronic device 802, such as many modern set-top boxes and home network routers. The dongle consists of a USB port 808, a hinge 810 for redirecting sensors 806 and a main housing 804 which encloseures the internal circuitries of the device. Having the clock in this form allows for the retrofitting of existing devices for energy footprint management. Software and firmware ran be pre-loaded on to the dongle and installed in the managed device 802 so that necessary drivers cooperate with the energy footprint management system.

Many alterations and modifications may be made by those having ordinary skill in the art without departing from the spirit and scope of the embodiments. Therefore, it must be understood that the illustrated embodiment has been set forth only for the purposes of example and that it should not be taken as limiting, the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material of acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially chinned as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. A power state management system of an electronic system including a plug load device comprising:
    a context clock to adjust a duty cycle of the electronic system for controlling the power states of the electronic system for more efficient use of electricity, where the context clock is responsive to user input, multiple event driven activities or an external protocol determined policy or command;
    interface circuitry for communicating user input, multiple event driven activities, an external protocol determined policy or command to the context clock;
    and interface circuitry for communicating commands to the managed plug load device,
    wherein the interface circuitry for communicating commands to the managed plug load device comprises a system memory, where the context clock comprises a behavioral or biological clock, an environmental clock, a network clock, and a utility rate clock, each stored in the system memory, and where the context clock generates a power state schedule based on the behavioral or biological clock, environmental clock, and network clock, the context information of the power state schedule at any given time being ranked in the order of decreasing priority as direct user inputs, behavior sensor inputs, environmental sensor inputs, the utility rate clock, the network clock, and usage pattern respectively.

2. The power state management system of claim 1 where the context clock responsive to multiple event driven activities comprises a behavioral or biological clock responsive to an input communicated to the behavioral or biological clock to provide a behavioral or biological clock function as determined by personal daily activities to control the duty cycle.

3. The power state management system of claim 1 where the context clock responsive to multiple event driven activities comprises an environmental clock responsive to an input which detects ambient conditions to control the duty cycle.

4. The power state management system of claim 3 where the environmental clock responsive to an input which detects ambient conditions is responsive to an input which measures lighting, temperature, humidity, sound pressure level, proximity of a body, or optical data signals.

5. The power state management system of claim 1 where the context clock responsive to an external protocol determined policy or command comprises:
a network clock responsive to information downloaded or authorization as mandated from a service provider and/or a variable electricity rate clock set by utilities.

6. The power state management system of claim 1 where the interface circuitry for communicating, commands to the managed plug load device comprises a system memory and where the context clock responsive to user input, multiple event driven activities, an external protocol determined policy or command comprises a usage pattern clock determined by a historic record of a behavioral or biological clock, an environmental clock, and or a network clock, each stored in the system memory.

7. The power state management system of claim 1 where the context clock may include at least one subclock and where the context clock generates a power state schedule according to a specific user, service provider or utility agreement, a hierarchy of control by the context clock in response to multiple inputs, information, data or states of the subclock, if any is changeable according to a predetermined rule, order or agreement.

8. The power state management system of claim 1 where the context clock comprises a stand-alone context clock customized to control and report on a number of devices and applications with respect to their power state schedules.

9. The power state management system of claim 8 where the stand-alone context clock comprises a dongle with universal serial bus (USB) connectivity.

10. The power state management system of claim 1 where the context clock is integrated within a single plug load device's internal electronics to control and report power state schedules.

11. The power state management system of claim 10 comprising a power bus included within the internal electronics to control and supply direct current power for an electronic component of the plug load device.

12. The power state management system of claim 11 where the electronic component of the plug load device comprises a central processing unit (CPU), hard drive, memory, audio/visual output device and/or tuner.

13. The power state management system of claim 1 where the context clock selectively controls a single plug load device or a plurality of connected plug load devices according to an optimal power state schedule.

14. The power state management system of claim 1 further comprising communication circuitry communicated with the context clock to collect voluntary usage patterns and/or field data and transmit the patterns and data to a regulatory agency or utility company.

15. The power state management system of claim 14 further comprising a database system hosted by the regulatory agency or utility company to collect usage patterns and/or field data.

16. The power state management system of claim 1 where the context clock, comprises an energy management system with no direct inputs, so that it is user-intervention-free.

17. A method to control an electronic system comprising:
providing a power state management system with a stand-alone clock to adjust a duty cycle of the electronic system for controlling the power states of the electronic system for more efficient use of electricity, where the stand-alone clock is responsive to user input, multiple event driven activities or an external protocol determined policy or command; and
programming the stand-alone clock device with remote control protocols and/or key codes for existing home appliances, lighting, electric or electronic devices,
wherein the electronic system comprises a system memory, where the stand-alone clock comprises a behavioral or biological clock, an environmental clock, a network clock, and a utility rate clock, each stored in the system memory, and where the stand-alone clock generates a power state schedule based on the behavioral or biological clock, environmental clock, and network clock, the context information of the power state schedule at any given time being ranked in the order of decreasing priority as direct user inputs, behavior sensor inputs, environmental sensor inputs, the utility rate clock, the network clock, and usage pattern respectively.

18. The method of claim 17 further comprising updating software modules in the power state management system to allow the electronic system to update an internal power management scheme.

19. The method of claim 18 where the internal power management scheme includes standby, light sleep and deep sleep functions, and or "on" and "off" states.

20. The method of claim 17 comprising managing a plurality of power states schedules for a plurality of home appliances, lighting, and electric or electronic devices using the context clock as a hub.

21. The method of claim 17 further comprising determining an optimal power management plan from information comprising:
electricity rates from a utility company;
a software update package from a service provider; and/or
a behavior pattern from a personal mobile device.

22. A method for control of a power state management system comprising:
providing a power state management system with an integrated context clock within the internal electronics of a plug load device to control and report power state schedules of use, where the internal electronics are selectively activated on a demand of end user demand determined by the context clock, and to adjust a duty cycle of the plug load device for controlling the power states of the plug load device, for more efficient use of electricity, where the integrated clock is responsive to user input, multiple event driven activities or an external protocol determined policy or command; and
programming the integrated clock with remote control protocols and/or key codes for existing home appliances, lighting, electric or electronic devices,
wherein the interface circuitry for communicating commands to the managed plug load device comprises a system memory, where the context clock comprises a behavioral or biological clock, an environmental clock, a network clock, and a utility rate clock, each stored in the system memory, and where the context clock generates a power state schedule based on the behavioral or biological clock, environmental clock, and network clock, the context information of the power state schedule at any given time being ranked in the order of decreasing priority as direct user inputs, behavior sensor inputs, environmental sensor inputs, the utility rate clock, the network clock, and usage pattern respectively.

* * * * *